United States Patent [19]

Peterson

[11] Patent Number: 5,427,430
[45] Date of Patent: Jun. 27, 1995

[54] AIR DAM FOR SNOWMOBILES

[75] Inventor: Lonn M. Peterson, Eden Valley, Minn.

[73] Assignee: Recreational Engineering, Ltd., Eden Valley, Minn.

[21] Appl. No.: 126,273

[22] Filed: Sep. 27, 1993

[51] Int. Cl.⁶ .............................................. B62D 37/02
[52] U.S. Cl. .................................. 296/180.1; 180/903; D12/181
[58] Field of Search ................. 180/190, 903; 280/727, 280/762; 296/180.1, 180.2, 180.3, 180.4, 180.5; D12/7, 181

[56] References Cited

U.S. PATENT DOCUMENTS

| D. 283,887 | 5/1986 | Koch | D12/181 |
| D. 287,481 | 12/1986 | Kato et al. | D12/181 |
| D. 291,076 | 7/1987 | Kawaguchi et al. | D12/181 |
| D. 300,525 | 4/1989 | Kikuchi et al. | D12/181 |
| 3,815,696 | 6/1974 | Larive et al. | 296/180.5 X |

FOREIGN PATENT DOCUMENTS

| 61-196882 | 9/1986 | Japan | 296/180.1 |
| 2071581 | 9/1981 | United Kingdom | 296/180.1 |

*Primary Examiner*—Andrew C. Pike
*Attorney, Agent, or Firm*—David George Johnson

[57] ABSTRACT

An air dam (100) for a snowmobile (10) diverts air away from a cavity beneath the front end (12) of the snowmobile (10). The air dam (100) extends forward and downward, and, thus, diverted air imparts a downwardly directed force on the air dam (100), thereby helping to maintain the skis (20a, 20b) of the snowmobile (10) in contact with the ground. A template (160) is used to form rivet holes (119) in the sidewalls (114, 118) of the air dam (100) as well as in the belly pan (18) of the snowmobile (10) to which the air dam (100) is attached.

6 Claims, 4 Drawing Sheets

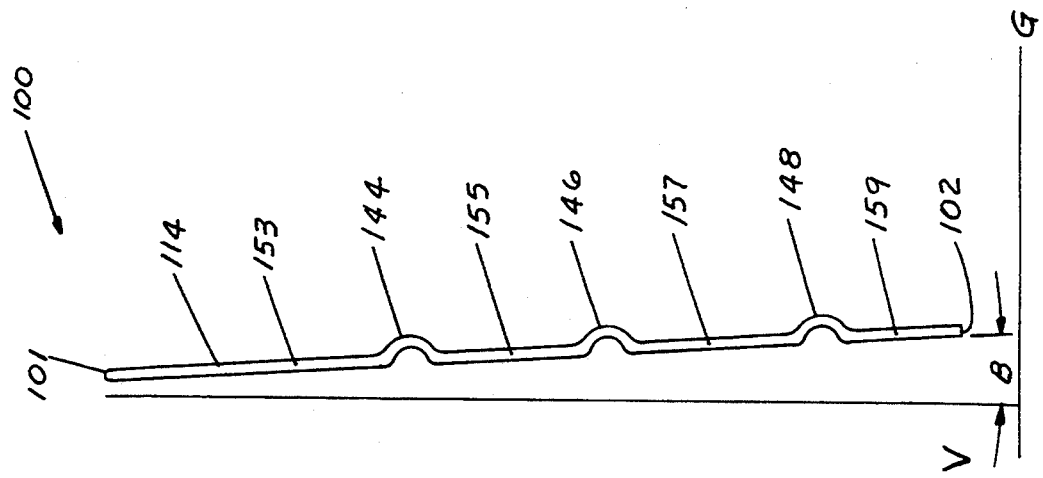
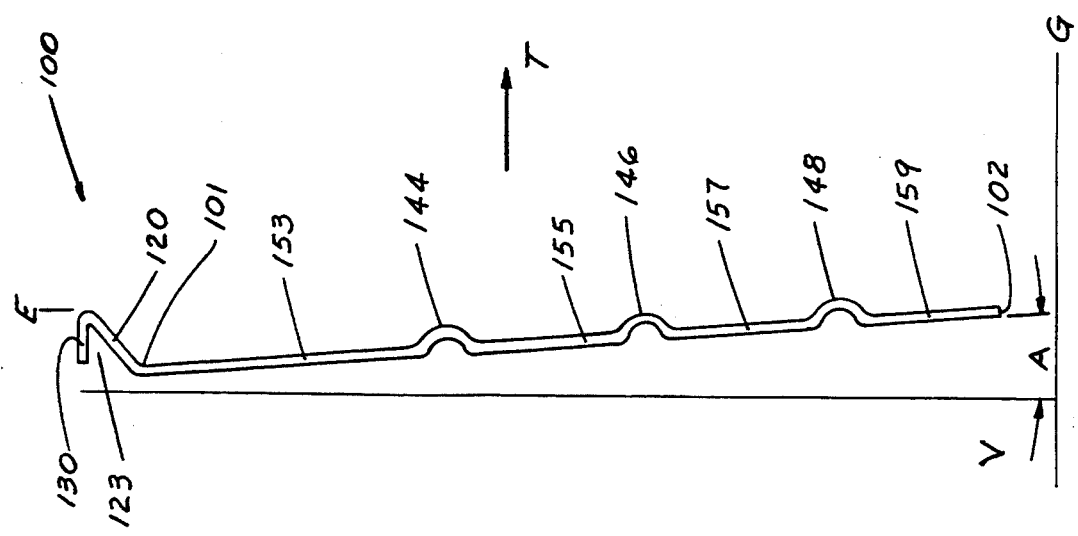

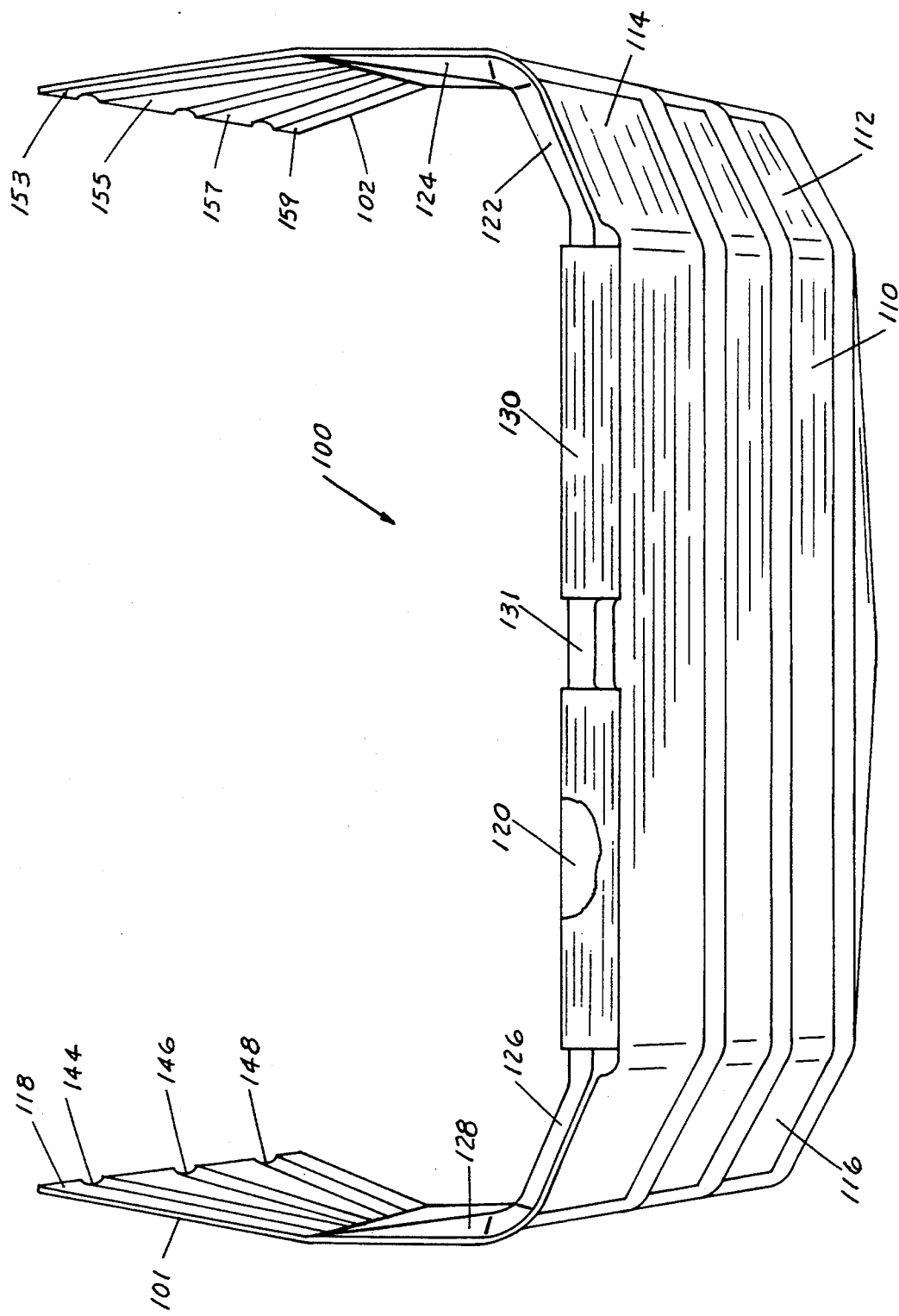

AIR DAM FOR SNOWMOBILES

FIELD OF THE INVENTION

The present invention relates to snowmobiles, and more particularly, to an air dam that mounts on the front end of a snowmobile to decrease upwardly directed air pressure and/or increase downwardly directed air pressure on the front end of the snowmobile.

BACKGROUND OF THE INVENTION

The upper and lower body surfaces of a conventional snowmobile converge toward a nose cone or similar structure at the front end of the snowmobile. Accordingly, as the lower body surface of the snowmobile approaches the nose cone, the lower body surface or belly pan is relatively farther from the ground. When the snowmobile travels forward, air is packed in the cavity beneath the front end and exerts an upward force on the belly pan. At some critical speed, which depends on several factors including the type of snowmobile and the operating conditions, this upwardly directed air pressure is sufficient to eliminate meaningful contact between the skis and the ground for steering purposes. In extreme cases on high performance snowmobiles, the upward air pressure lifts the front end completely off the ground and sometimes even flips the snowmobile over backwards. Thus, it is desirable to counteract or minimize this upward air pressure on the belly pan of snowmobiles.

SUMMARY OF THE INVENTION

The present invention provides an air engaging member that is secured to the front end of a snowmobile at an upwardly facing angle relative to the direction of forward travel in order to divert air upward during forward travel. In other words, an upper edge on the air engaging member or air dam is rearward of a lower edge on the air dam. When the snowmobile is traveling forward, the air dam diverts some amount of air that previously would have imparted an upwardly directed force on the belly pan. Furthermore, the air that impacts the air dam between the lower edge and the upper edge imparts a downwardly directed force on the air dam as it (the air) is diverted upward. Recognizing that some amount of air passes below the lower edge of the air dam, this downwardly directed force on the air dam counteracts some or all of the remaining upwardly directed air pressure on the belly pan.

In a preferred embodiment, the air dam has a front wall that clips onto the nose cone of the snowmobile. The clip extends forward from the upper edge of the air dam, thereby allowing some inclination of the front wall without extending the lower edge of the air dam forward beyond the nose cone. A pair of opposite side walls extend from opposite sides of the front wall and are riveted to respective sides of the belly pan of the snowmobile. The front wall and side walls cooperate to define a substantially U-shaped, air impervious shroud.

Several ribs extend laterally about the air dam to enhance structural integrity and to provide a series of guides for trimming the air dam to a desired length. In this regard, if a person wants two additional inches of clearance between the bottom of the air dam and the ground, he or she can cut off the bottom two inches of the air dam and maintain the original shape of the air dam by cutting parallel to the nearest rib.

The many advantages of the present invention will become more apparent upon a more detailed description of a preferred embodiment.

BRIEF DESCRIPTION OF THE DRAWING

In the Drawing, wherein like numerals represent like parts and assemblies throughout the several views.

FIG. 3 is a side view of a section of the preferred embodiment air dam shown in FIG. 2, taken along the reference line 3—3;

FIG. 4 is a side view of another section of the preferred embodiment air dam shown in FIG. 2, taken along the reference line 4—4; and FIG. 5 is a top view of the preferred embodiment air dam shown in FIG. 2.

DETAILED DESCRIPTION OF A PREFERRED EMBODIMENT

Figure 1:
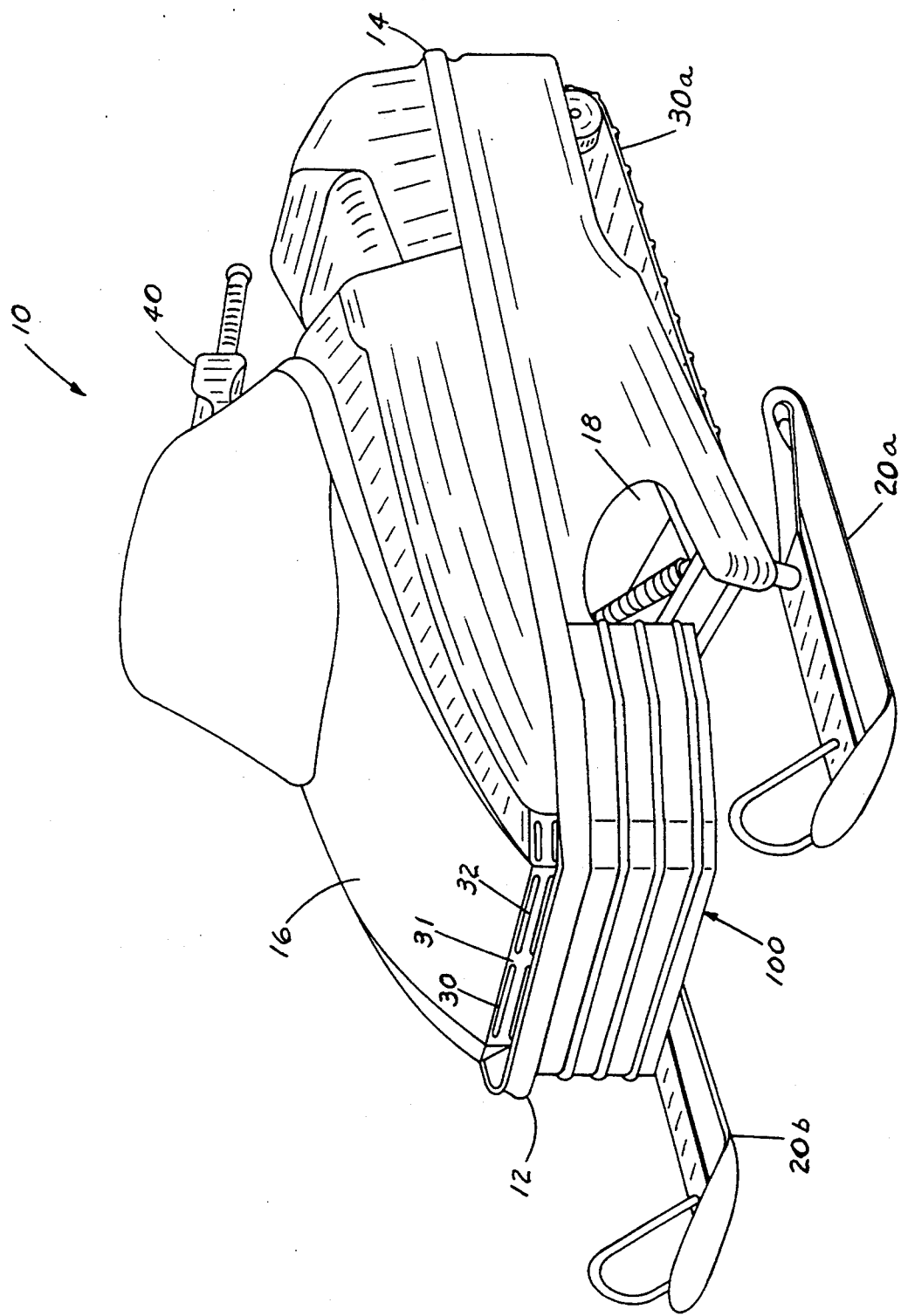
FIG. 1 is a perspective view of a snowmobile fitted with a preferred embodiment air dam constructed according to the principles of the present invention.

A preferred embodiment snowmobile air dam constructed according to the principles of the present invention is designated as 100 in FIGS. 1-5. FIG. 1 shows the air dam 100 mounted on an otherwise conventional snowmobile 10. The snowmobile 10 has a front end 12 supported above the ground by a pair of skis 20a and 20b, and a rear end 14 supported above the ground by a pair of treads, one of which is shown as 30a. The treads drive the snowmobile 10, and the orientation of the skis 20a and 20b determines the direction of travel. A handlebar 40 is connected to the skis 20a and 20b, so that a person can steer the snowmobile by turning the handlebar 40. The steering function of the skis 20a and 20b requires that the skis remain in contact with the ground relative to which the snowmobile is traveling.

The front end 12 of the snowmobile 10 includes an upper body surface or hood 16 and a lower body surface or belly pan 18, which converge at a nose cone 30. From the mid-section of the snowmobile forward, the belly pan 18 angles upward relative to the ground, thereby creating a cavity between the front end 12 of the snowmobile and the ground. As a conventional snowmobile travels forward, air is packed in the cavity beneath the front end 12, and this captured air exerts an upward force on the belly pan 18 of the snowmobile. At some critical speed, which depends on factors including the type of snowmobile and the operating conditions, this upward air pressure is sufficient to eliminate meaningful contact between the skis and the ground for steering purposes. In extreme cases on high performance snowmobiles, the upward air pressure lifts the front end completely off the ground, and sometimes even flips the snowmobile over backwards.

Figure 2:
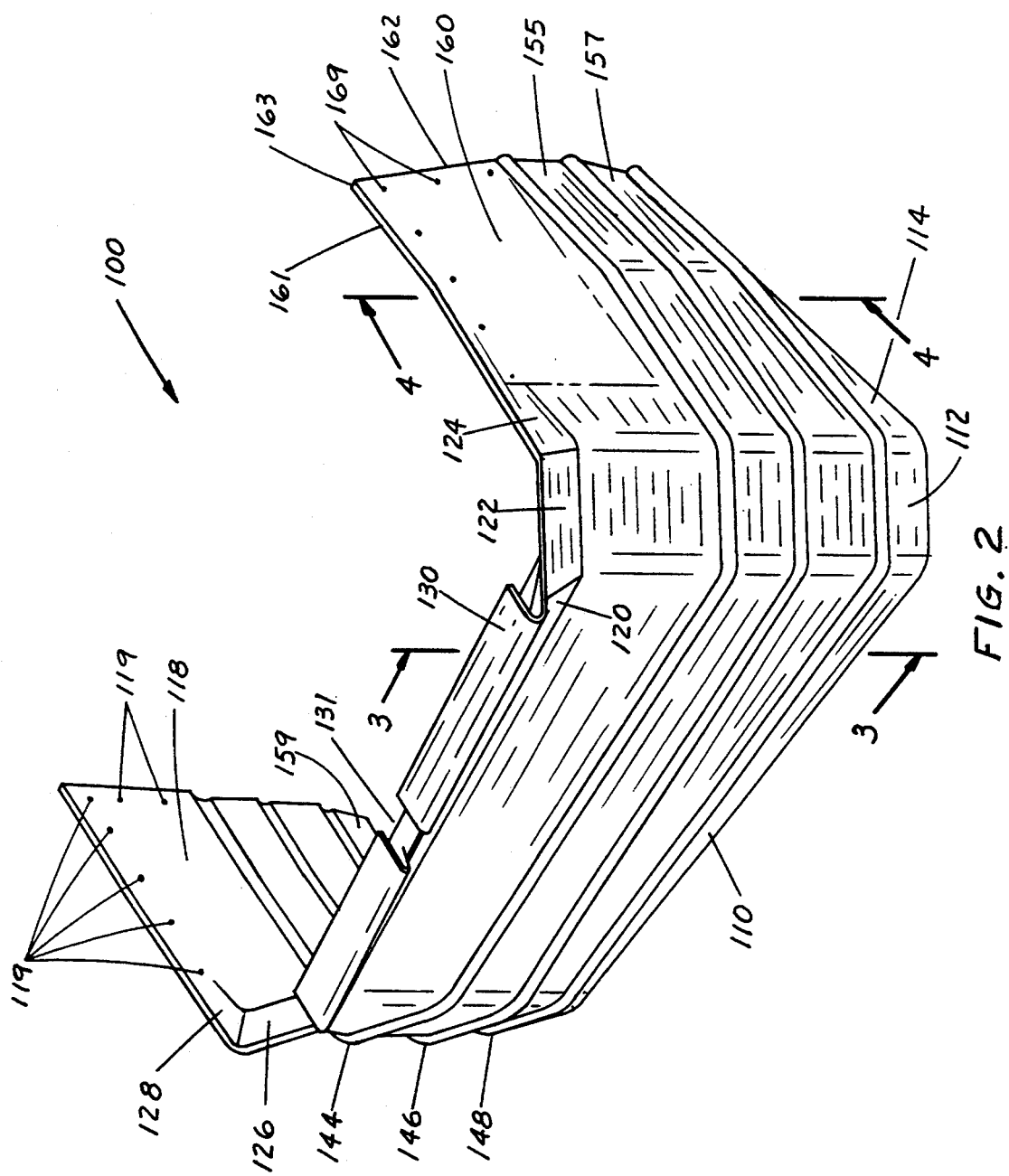
FIG. 2 is a perspective view of the preferred embodiment air dam shown in FIG. 1.

The otherwise conventional snowmobile 10 shown in FIG. 1 is fitted with the preferred embodiment air dam 100 to alleviate the Prior Art problem discussed above. With reference to FIGS. 2 and 5, the air dam 100 includes a front wall 110, first and second intermediate walls 112 and 116, and first and second side walls 114 and 118, which are connected together to define a substantially U-shaped shroud. The intermediate walls 112 and 116 extend laterally and rearwardly from opposite sides of the front wall 110 at angles of approximately 135 degrees relative thereto, and the side walls 114 and 118 extend rearwardly from the intermediate walls 112 and 116, respectively, at angles of approximately 135 degrees relative thereto. In the preferred embodiment, the walls 110, 112, 114, 116, and 118 are integral portions of a one-eighth inch sheet of high impact plastic that has been vacuum formed.

A plurality of ribs or ridges 144, 146, and 148 are formed in the shroud or air dam 100 and extend parallel to the bottom or lower edge 102 thereof. The ribs 144, 146, and 148 enhance structural integrity of the shroud 100 and provide a plurality of guides for selectively trimming the shroud to a desired height. The lowermost rib 148 is positioned approximately one and one-half inches from the lower edge of the air dam 100; the intermediate rib 146 is positioned approximately four inches from the lower edge of the air dam 100; and the uppermost rib is positioned approximately six and one-half inches from the lower edge of the air dam 100. The ribs 144, 146, and 148 divide the air dam 100 into lateral sections 153, 155, 157, and 159. The uppermost lateral section 153 spans approximately five and one-half inches between the uppermost rib 144 and the upper edge 101 of the walls 110, 112, 114, 116, and 118.

A lip 120 extends outwardly and upwardly from the top or upper edge of the front wall 110, and a flange 130 extends rearwardly from the top or upper edge of the lip 120. The lip 120 continues laterally into lips 122 and 126, which extend outwardly and upwardly from the tops or upper edges of respective intermediate walls 112 and 116. The lips 122 and 126 continue laterally into lips 124 and 128, which extend outwardly and upwardly from the tops or upper edges of respective side walls 114 and 118. The lips 124 and 128 asymptotically merge into the top edges of respective side walls 114 and 118, as can be seen in FIGS. 1 and 4. The lips 122, 124, 126, and 128 are configured to align with the contour of the belly pan 18 when the air dam 100 is mounted on the snowmobile 10.

As shown in FIG. 3, the lip 120 and the flange 130 cooperate to define a V-shaped channel 123 that clips onto the nose cone 30 of the snowmobile 10. The nose cone 30 includes a central support or post 31 and a series of openings 32 disposed on each side of the post 31. The openings 32 provide access for air to reach the engine of the snowmobile. A centrally located notch 131 is formed in the upper flange 130 to provide clearance for the central post 31, so that the flange halves on each side of the notch 131 can be inserted into the lowermost openings 32 on each side of the central post 31. The mating of the post 31 with the notch 131 ensures that the air dam 100 is symmetrically aligned relative to the snowmobile 10. An adhesive may be disposed within the V-shaped channel 123 to more securely adhere the air dam 100 to the nose cone 30.

As shown in FIG. 3, when the air dam 100 is installed on the snowmobile 10, the front wall 110 is oriented at an angle A relative to a vertical line V extending from the ground surface G, and thus, at an angle of A+90 degrees relative to the ground surface G and the direction of travel T. As a result, the front wall 110 diverts air away from the cavity beneath the front end of the snowmobile, and moreover, the diverted air imparts a downwardly directed force on the front wall 110.

Also as shown in FIG. 3, when the air dam 100 is installed on the snowmobile 10, the front wall 110 extends downward and forward from a first position (upper edge 101) rearward of the forwardmost edge E on the nose cone 30 to a second position (lower edge 102) forward of the forwardmost edge E. One advantage of this arrangement is that the magnitude of angle A is realized without extending the lower edge 102 very far beyond the forwardmost edge E of the nose cone 30.

The side walls 114 and 118 extend substantially rearwardly from the front wall 110 and lie in proximity to respective sides of the belly pan 18, and in the preferred embodiment, the side walls 114 and 118 are riveted thereto. A template 160 is used in forming rivet holes 119 in the side walls 114 and 118 and the sides of the belly pan 18. The template 160 has a first edge 161 and a second edge 162 that intersect to establish a square corner 163. Two rows of marks 169 extend away from the corner 163, one row parallel to the first edge 161, and the other row parallel to the second edge 162. Upon alignment of the template 160 relative to the first and second side walls 114 and 118 and the opposite sides of the belly pan 118, the marks 169 indicate where holes should be formed for purposes of riveting the first and second side walls 114 and 118 to respective opposite sides of the belly pan 18.

As shown in FIG. 4, when the air dam 100 is installed on the snowmobile 10, the side wall 114, which is representative of side wall 118, is oriented at an angle B relative to a vertical line V extending from the ground surface G, and thus, an angle of 90+B degrees relative to the ground surface G. As shown in FIG. 5, the upper and lower edges 101 and 102, respectively, as well as the ribs 144, 146, and 148 disposed therebetween, are concentrically aligned relative to one another and increase in size as a function of their distance from the upper edge 101. Thus, the air dam 100 may be said to be a skirted shroud that extends downwardly and outwardly from a substantially U-shaped upper edge 101 to a substantially U-shaped lower edge 102.

Although the present invention has been described with reference to a preferred embodiment, various other embodiments and applications fall within the scope of the present invention. For example, the lower edge 102 of the air dam 100 need not be the lowermost edge. In other words, a lowermost edge could be disposed beneath the lower edge 102, and the present invention would still function, regardless of the inclination of this lowermost edge. As another example, the number and location of the ribs 144, 146, 148 are preferred but not essential to the present invention. Accordingly, the scope of the present invention should be limited only by the following claims.

I claim:

1. A combination of a snowmobile and a device to be connected to a front end of said snowmobile, said front end of said snowmobile having a nose cone and a belly pan, said device comprising:

a connecting means for connecting the device to the nose cone of the snowmobile;

a front wall connected to said connecting means, wherein when the device is connected to the nose cone, said front wall extends downward and forward from said connecting means;

a first side wall connected to said front wall, wherein when the device is connected to said nose cone, said first side wall extends rearward from said front wall; and a second side wall connected to said front wall, wherein when the device is connected to said nose cone, said second side wall extends rearward from said front wall, said first and second side walls being designed to be connected to opposite sides of the belly pan of the snowmobile;

wherein the combination further comprises a template having a first edge and a second edge that intersect to establish a square corner, a first row of marks extending away from said corner parallel to said first edge, and a second row of marks extending away from said corner parallel to said second edge, wherein upon alignment of said template relative to said first and second side walls and the opposite sides of the belly pan, said marks indicate where holes should be formed for purposes of riveting said first and second side walls to respective said opposite sides of the belly pan.

2. A combination of a snowmobile and a device to be connected to a front end of said snowmobile, said front end of said snowmobile having a nose cone and a belly pan, said device comprising:
   a connecting means for connecting the device to the nose cone of the snowmobile;
   a front wall connected to said connecting means, wherein when the device is connected to the nose cone, said front wall extends downward and forward from said connecting means;
   a first side wall connected to said front wall, wherein when the device is connected to said nose cone, said first side wall extends rearward from said front wall; and
   a second side wall connected to said front wall, wherein when the device is connected to said nose cone, said second side wall extends rearward from said front wall;
   said connecting means including a first flange extending upwardly and forwardly from said front wall, and a second flange extending rearwardly from said first flange, said first and second flanges cooperating to define a V-shaped channel that is configured to clip onto the nose cone of the snowmobile;
wherein the combination further comprises a centrally located notch formed in said second flange, said centrally located notch engaging a center post on the nose cone and thereby symmetrically aligning the device relative to the snowmobile.

3. A combination of an air dam for a snowmobile and a snowmobile having a belly pan and a nose cone with a forwardmost edge, the air dam comprising:
   a front wall; and
   a connecting means for connecting said front wall to the nose cone of the snowmobile in such a manner that said front wall extends downward and forward from a first position rearward of said forwardmost edge to a second position forward of said forwardmost edge.

4. The combination according to claim 3, further comprising a pair of opposing side walls connected to opposite sides of said front wall to define a substantially U-shaped member.

5. The combination according to claim 4, further comprising another connecting means for connecting said side walls to respective sides of the belly pan of the snowmobile.

6. The combination according to claim 3, further comprising ridges formed in said front wall to enhance structural integrity.

* * * * *